United States Patent
Ueda et al.

(10) Patent No.: US 7,293,954 B2
(45) Date of Patent: Nov. 13, 2007

(54) CENTRIFUGAL COMPRESSOR FOR TURBO CHILLER, TURBO CHILLER, AND CONTROL METHOD THEREFOR

(75) Inventors: Kenji Ueda, Aichi-ken (JP); Yoshinori Shirakata, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 205 days.

(21) Appl. No.: 11/024,875

(22) Filed: Dec. 30, 2004

(65) Prior Publication Data
US 2006/0147301 A1   Jul. 6, 2006

(51) Int. Cl.
*F04D 27/02* (2006.01)
(52) U.S. Cl. .................. 415/17; 415/28; 415/144
(58) Field of Classification Search .......... 415/17, 415/48, 26, 28, 144
See application file for complete search history.

(56) References Cited

U.S. PATENT DOCUMENTS

| | | | |
|---|---|---|---|
| 4,749,331 A | * | 6/1988 | Blotenberg .............. 415/47 |
| 5,065,590 A | * | 11/1991 | Powell et al. ............. 62/175 |
| 5,335,507 A | * | 8/1994 | Powell ..................... 62/129 |
| 6,213,724 B1 | * | 4/2001 | Haugen et al. ............ 417/63 |
| 6,981,838 B2 | * | 1/2006 | McKee et al. ............. 415/1 |

FOREIGN PATENT DOCUMENTS

| | | |
|---|---|---|
| JP | 8-233382 | 9/1996 |
| JP | 2000-505525 | 5/2000 |
| WO | WO97/38270 | 10/1997 |

\* cited by examiner

*Primary Examiner*—Edward K. Look
*Assistant Examiner*—Dwayne J White
(74) *Attorney, Agent, or Firm*—Westerman, Hattori, Daniels & Adrian, LLP.

(57) ABSTRACT

A turbo chiller that can accurately determine the existence of surging occurring in a centrifugal compressor is provided. In a centrifugal compressor of a turbo chiller, which includes an impeller for compressing refrigerant, a resistance temperature sensor for detecting the refrigerant temperature is provided at the upstream side of the impeller. Accordingly, a temperature rise caused by surging can be detected and the existence of surging can be accurately determined.

3 Claims, 3 Drawing Sheets

CENTRIFUGAL COMPRESSOR FOR TURBO CHILLER, TURBO CHILLER, AND CONTROL METHOD THEREFOR

BACKGROUND OF THE INVENTION

1. Field of the Invention

The present invention relates to a turbo chiller and a control method therefor that achieve heating and cooling by means of a centrifugal compressor, which is turbomachinery.

This application is based on patent application No. 2003-294340 filed in Japan, the content of which is incorporated herein by reference.

2. Description of Related Art

Centrifugal compressors used in turbo chillers exhibit unstable behavior called rotating stall and surging (stall) under low-airflow, high-head operating conditions.

In order to overcome this problem, conventionally, a portion of the hot gas exhausted from the centrifugal compressor is returned to the suction side of the centrifugal compressor to perform hot gas bypass control for maintaining the airflow (volumetric flow). (See, for example, Japanese Unexamined Patent Application, First Publication No. HEI 8-233382, paragraph [0005] and FIG. 4 therein.)

Before carrying out control for protecting the compressor, such as hot gas bypass control and so forth, it is necessary to predict or detect rotating stall and surging.

As one means for detecting surging, the technique disclosed in Japanese Unexamined Patent Application, First Publication No. 2000-505525 (pages 7 to 9 and FIG. 1 therein), which is described below, is known.

In Japanese Unexamined Patent Application, First Publication No. 2000-505525, a technique for detecting surging based on a change in the electrical current of a variable-speed driving apparatus for driving the compressor and on a pressure difference between the two ends of the compressor (more concretely, the pressure difference between the condenser and the evaporator) is disclosed.

However, with the technique disclosed in the above-described Japanese Unexamined Patent Application, First Publication No. 2000-505525, there is a problem in that it is not possible to detect rotating stall or surging with high accuracy for the reason described below.

In the compressor of the turbo chiller, the condenser and the evaporator, which have large capacities compared to the compressor, are connected. Therefore, when detecting rotating stall or surging based on the pressure difference between the two ends of the compressor, even when changes in pressure occur as a result of the rotating stall and surging, the amount of change in the pressure difference between the two ends of the compressor becomes smaller because the pressure changes are absorbed in the high-capacity condenser and evaporator, and there occurs some time delay. Therefore, it is not possible to accurately determine the occurrence of rotating stall or surging.

Furthermore, detecting surging by combining the pressure inside the condenser and the temperature of cooling water that cools the condenser is also known. However, because the temperature of the cooling water changes suddenly depending on the number of operating cooling towers, which cool the cooling water outside, changes in the pressure inside the condenser are caused regardless of whether or not surging occurs. Under such circumstances, it is not possible to distinguish between changes in pressure as a result of changes in the cooling water temperature and changes in pressure as a result of surging.

BRIEF SUMMARY OF THE INVENTION

In light of the above-described problems, an object of the present invention is to provide a turbo chiller and a control method therefor in which rotating stall and surging occurring in a centrifugal compressor can be accurately detected.

In order to overcome the above-described problems, the centrifugal compressor of the turbo chiller, the turbo chiller, and the control method therefor of the present invention adopt the features described below.

The centrifugal compressor of the turbo chiller according to the present invention includes, downstream of an impeller for compressing a refrigerant, a temperature sensor for detecting the refrigerant temperature.

When surging occurs, because the refrigerant compressed and discharged by the impeller flows backwards, surging can be detected by a rise in refrigerant temperature at the upstream side of the impeller. That is, surging can be accurately detected by providing a temperature sensor at the upstream side of the impeller for detecting the refrigerant temperature.

Also, because the liquid refrigerant expands at the upstream side of the impeller as a result of a so-called carry-over effect whereby the compressor sucks in liquid refrigerant, the refrigerant temperature falls. By detecting this temperature fall with the temperature sensor, it is possible to detect the occurrence of carry-over.

The position of the temperature sensor at the upstream side of the impeller is downstream of an inlet vane disposed at the upstream side of the impeller, upstream of the inlet vane, downstream of a compressor suction pipe, or inside the compressor suction pipe. The closer it is to the impeller, the better surging can be detected.

As the temperature sensor, a resistance temperature sensor is preferred since its detection accuracy and sensitivity are superior.

Furthermore, a centrifugal compressor for a turbo chiller according to the present invention may include an impeller for compressing a refrigerant, a diffuser disposed on the outer circumference of the impeller, and a pressure sensor, provided at the outer circumferential edge of the diffuser, for detecting the pressure of the refrigerant.

Surging is generated as a result of rotating stall increasing. Rotating stall occurs at the outer circumferential edge of the diffuser. It is possible to detect rotating stall by means of the pressure sensor disposed on the outer edge of the diffuser.

A turbo chiller according to the present invention includes the above-mentioned centrifugal compressor; a changing-current determining device which detects a driving current of an electric motor for driving the impeller to determine changes in the current; and a surging determining device which detects a rise in refrigerant temperature from the output of the temperature sensor to determine the existence of surging.

Because the refrigerant temperature rises at the upstream side of an impeller that experiences surging, the occurrence of surging is determined by the surging determining device.

By combining these features, highly accurate surging detection can be realized.

Furthermore, a turbo chiller according to the present invention may include a hot gas bypass pipe which channels part of the refrigerant at the discharge side of the centrifugal compressor towards the suction side; a hot gas bypass valve disposed in the hot gas bypass pipe; and a hot gas bypass valve control device which, after determining the existence of surging with the surging determining device, opens the hot gas bypass valve by a predetermined amount and, in response to a change in current obtained by the changing-current determining device, further opens the hot gas bypass valve.

Because the hot gas bypass control returns hot gas to the compressor suction side without using the compressed refrigerant in the refrigerating cycle, there is a disadvantage in terms of thermal efficiency. However, by gradually opening the hot gas bypass valve in several steps, using the hot gas bypass valve control device, the thermal efficiency can be quickly prevented from falling.

A turbo chiller according to the present invention may also include a rotation-speed control device that controls the rotation speed of the electric motor by means of an instruction; and an excessive-rotation-speed determining device for determining whether or not a designated value of the rotation speed control device exceeds a rating by a predetermined amount.

If the rated rotation speed of the electric motor is exceeded due to a transient disturbance unrelated to surging, it is not necessary to quickly switch to surging detection. The electric motor, which is provided with a rotation speed control device such as the inverter, simply exceeds the rated rotation speed by a predetermined amount due to a delayed response from another apparatus, even in the event of a transient disturbance to the turbo chiller. Therefore, by using the excessive-rotation-speed determining device, a certain increase in rotation speed is allowed and changing to surging detection control can be delayed, thus preventing erroneous surging detection as a result of a transient disturbance.

A turbo chiller control method includes determining the existence of surging when the temperature of a refrigerant rises at the upstream side of in impeller in a centrifugal compressor.

Since an increase in refrigerant temperature at the upstream side of the impeller is detected, it is possible to determine the occurrence of surging with high accuracy.

According to the present invention, the following advantages are obtained.

Since the temperature sensor for detecting the refrigerant temperature is provided at the upstream side of the impeller, it is possible to determine the occurrence of surging with high accuracy.

Since the pressure sensor is disposed on the outer edge of the diffuser, it is possible to detect rotating stall, which is a precursor to surging, and the occurrence of surging can be determined with high accuracy.

In addition to determining the occurrence of surging using the surging determining device, because a variation in driving current of the electric motor is detected by the changing-current determining device, higher accuracy surging detection can be realized.

Since the hot gas bypass valve is opened gradually in multiple steps by means of the hot gas bypass valve control device, the thermal efficiency can be quickly prevented from falling.

By using the excessive-rotation-speed determining device, since a certain increase in rotation speed is allowed and changing to surging detection control can be delayed, it is possible to prevent erroneous surging detection caused by a transient disturbance.

DETAILED DESCRIPTION OF THE INVENTION

A description of an embodiment of the present invention will be given below, with reference to the drawings.

Figure 1:
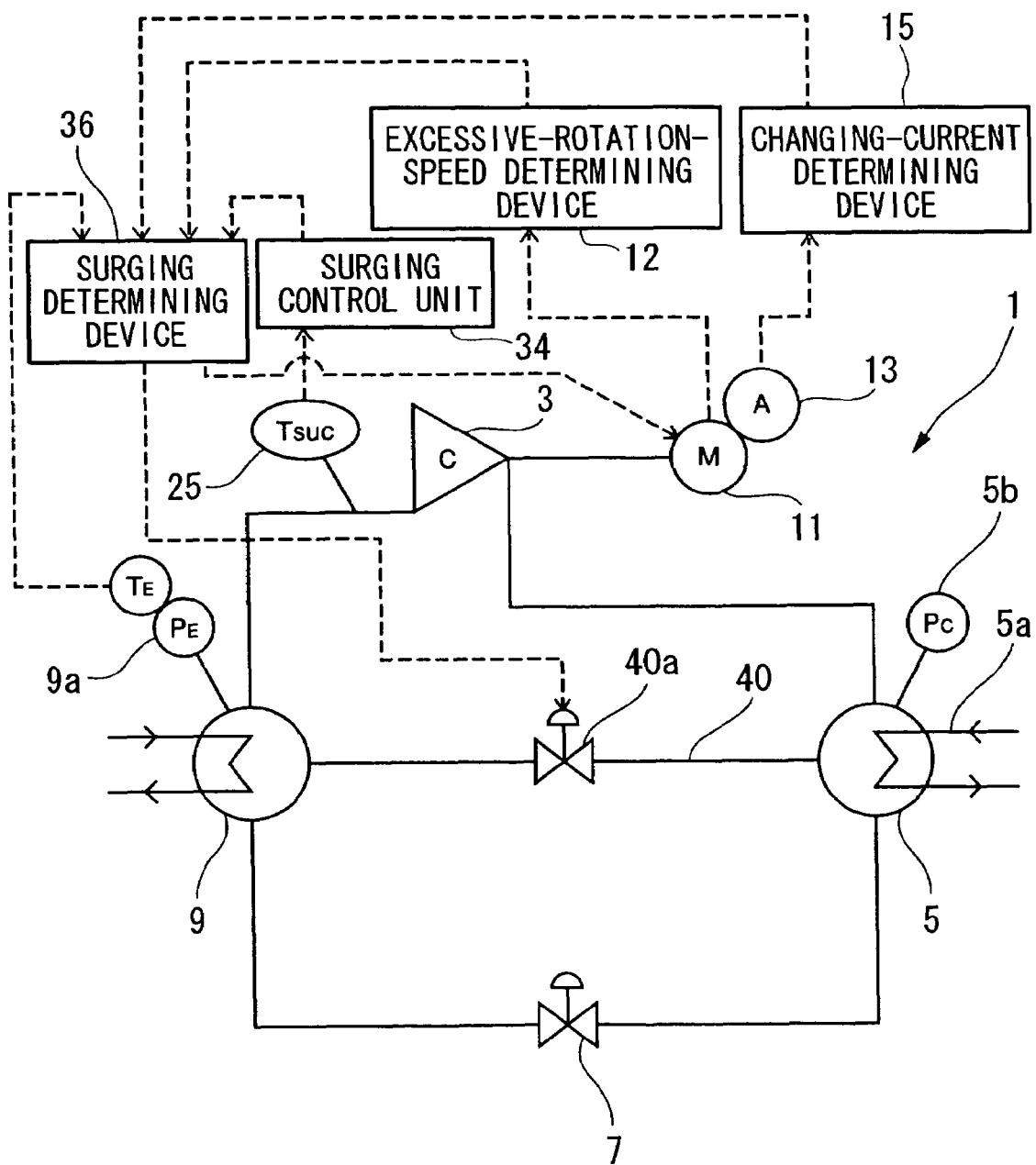
FIG. 1 shows an embodiment of a turbo chiller according to the present invention.

A schematic diagram of a turbo chiller 1 is shown in FIG. 1.

The turbo chiller 1 includes a compressor 3 for compressing a refrigerant, a condenser 5 for condensing the high-temperature, high-pressure gas refrigerant from the compressor 3, an expansion valve 7 for expanding the liquid refrigerant condensed in the condenser 5, and an evaporator 9 that evaporates the liquid refrigerant expanded by the expansion valve 7.

The compressor 3 is a centrifugal compressor in which high pressurization is achieved.

Figure 2:
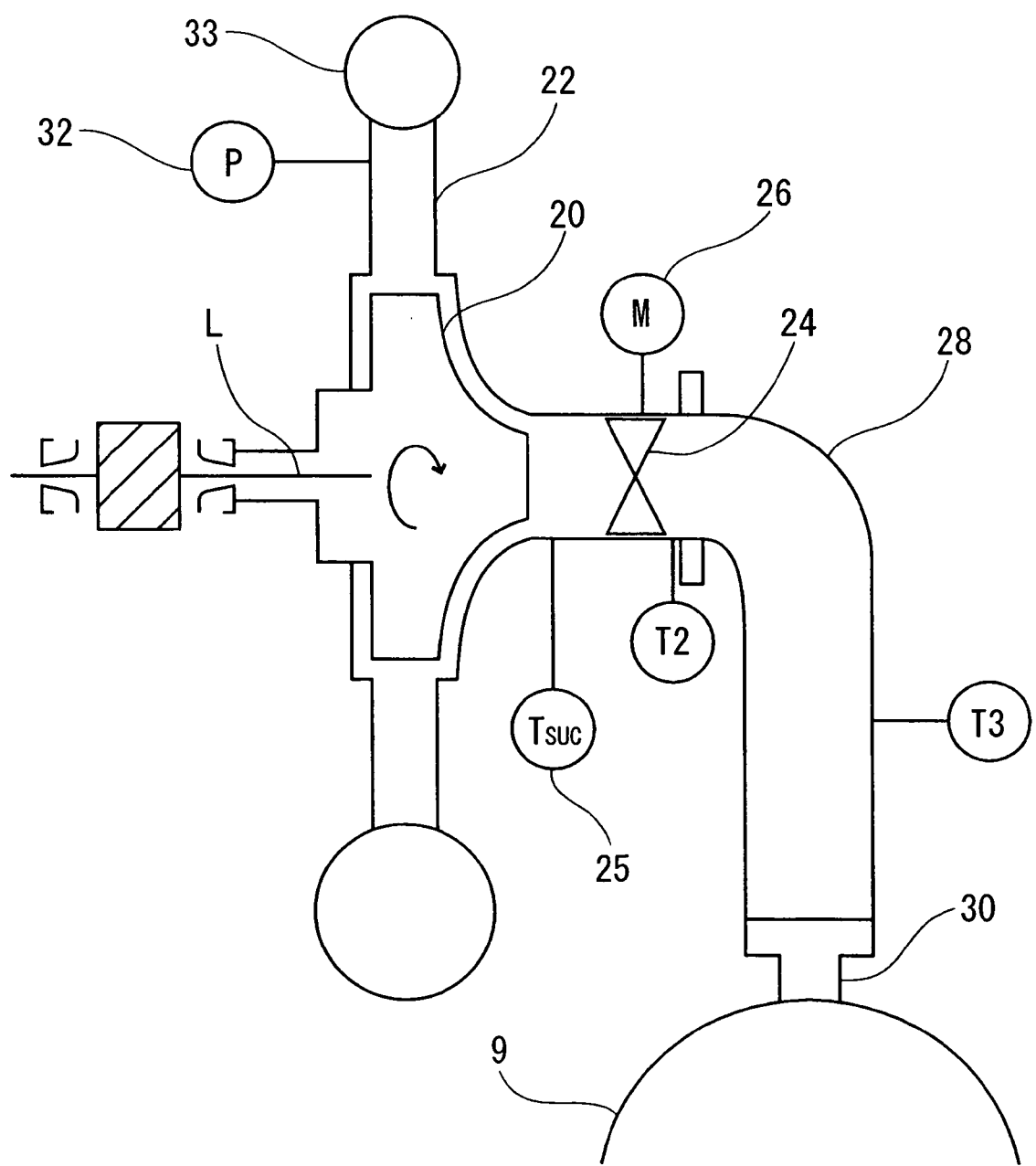
FIG. 2 is a sectional view showing the vicinity of a compressor.

As shown in FIG. 2, the compressor 3 includes an impeller that rotates about an axis L and a diffuser 22 that is positioned on the outer circumference of the impeller 20.

An inlet vane 24 for adjusting the amount of refrigerant flowing in is provided at the upstream side of the refrigerant flow (hereinafter simply referred to as the upstream side) in the impeller 20. This inlet vane 24 is arranged so that its rotation angle is varied by an inlet vane driving motor 26, and as a result, the amount of refrigerant flowing in is adjusted.

A resistance temperature sensor (temperature sensor) 25 is disposed at the upstream side of the impeller 20 and at the downstream side of the refrigerant flow (hereinafter simply referred to as downstream side) of the inlet vane 24. Changes in the refrigerant temperature are detected by this resistance temperature sensor 25.

As shown in FIG. 1, the output of the resistance temperature sensor is input to a surging determining device 34. A detector with a wire diameter of approximately 1.6 mm is used as the resistance temperature detector 25.

The surging determining device 34 determines whether or not surging exists from a suction temperature Tsuc of the impeller 20, which is measured by the resistance temperature sensor 25.

More concretely, the suction temperature Tsuc is normally 1° C. to 2° C. higher than an evaporator temperature TE, which is calculated from an evaporator pressure PE in the evaporator 9. Accordingly, when a condition occurs wherein the current suction temperature Tsuc is at least 3° C. to 5° C. higher, with respect to the average suction temperature which is averaged by sampling over the most recent 30-second interval, the occurrence of surging is detected by the surging determining device 34. That is, when surging occurs, high-temperature refrigerant in the compressor flows from the high-pressure side of the impeller to the low-pressure side, and the suction temperature Tsuc of the impeller 20 rises. Surging is determined by detecting a temperature change resulting from this rise in temperature.

The surging period differs depending on the capacity of the chiller, but since short surging lasts for approximately 2 to 5 seconds, the sampling period of the resistance temperature sensor 25 is set to be shorter than this.

As shown in FIG. 2, a compressor suction pipe 28 is connected at the upstream side of the inlet vane 24. The upper end of a condenser outlet pipe 30 that extends upwards from the evaporator 9, which is positioned below the compressor 3, is connected to the downstream end of this compressor suction pipe 28.

The diffuser 22 recovers the kinetic energy of the refrigerant flowing out from the impeller 20 as potential energy, and it has a ring-shaped space therein.

A pressure sensor 32 is provided on the outer circumferential edge of this diffuser 32. This pressure sensor 32 detects pressure changes at the outer circumferential edge of the diffuser 22 that are caused by rotating stalls.

A scroll housing 33 is disposed on the outer circumference of the diffuser 22, and the refrigerant flows out to the condenser 5 at the downstream side via this scroll housing 34.

As shown in FIG. 1, the compressor 3 is driven by an electric motor 11. The electric motor 11 is designed so that the rotation speed can be adjusted as desired by means of rotation speed control by the inverter (rotation speed control device).

The inverter is designed so as to designate a rated rotation speed to realize rated driving of the turbo chiller 1. An excessive-rotation-speed determining device 12 for determining whether the rotation speed is excessive in the event that this rated rotation speed exceeds a predetermined amount is provided. In the case of the present embodiment, when the designated rotation speed of the rated rotation speed is set at 100%, a rotation speed exceeding 103% is determined to be excessive. Also, this value of 103% as the standard for determining whether the rotation speed is excessive may be changed as desired according to the operating specifications of the turbo chiller.

An ammeter 13 for detecting the driving electric current used to drive the electric motor 11 is provided in the electric motor 11. Changes in this driving current are determined by a changing-current determining device 15. This changing-current determining device 15 determines whether the driving current changes based on the degrees of the electrical current amplitude over a predetermined period of time, varying frequency, and change in the average value of the electrical current amplitude over the predetermined period of time. In the present embodiment, when two amplitudes 10 seconds apart are at least 5% higher than the average driving current and this condition is repeated for 30 seconds, and when the difference in average values every 10 seconds for this 30-second period is at least 2%, it is determined that the driving current changes.

A hot gas bypass pipe 40 is provided between the condenser 5 and the evaporator 9. A hot gas bypass valve 40a for adjusting the amount of refrigerant flowing in the hot gas bypass pipe 40 is provided in the hot gas bypass pipe 40.

The hot gas bypass pipe 40 eliminates low airflow and causes the compressor 3 to operate in a stable region by bypassing high-temperature refrigerant (hot gas) at the condenser 5 side and making it flow into the compressor 3. Therefore, when the compressor 3 operates in the stable region, the hot gas bypass valve 40a is fully opened.

The degree of opening of the hot gas bypass valve 40a is controlled by a surging control unit 36.

A cooling pipe 5a into which cooling water is introduced from outside is provided in the condenser 5. The refrigerant flowing in the condenser 5 is cooled by means of the cooling water flowing in this cooling pipe. The refrigerant pressure PC in the condenser 5 is detected by a pressure sensor 5b. Also, the cooling water is cooled by means of an external cooling tower (not shown in the figure).

Output signals from the excessive-rotation-speed determining device 12, the changing-current determining device 15, and the surging determining device 34 are input to the surging control unit 36.

Control signals for the hot gas bypass valve 40a and the electric motor 11 are output from the surging control unit 36.

Figure 3:
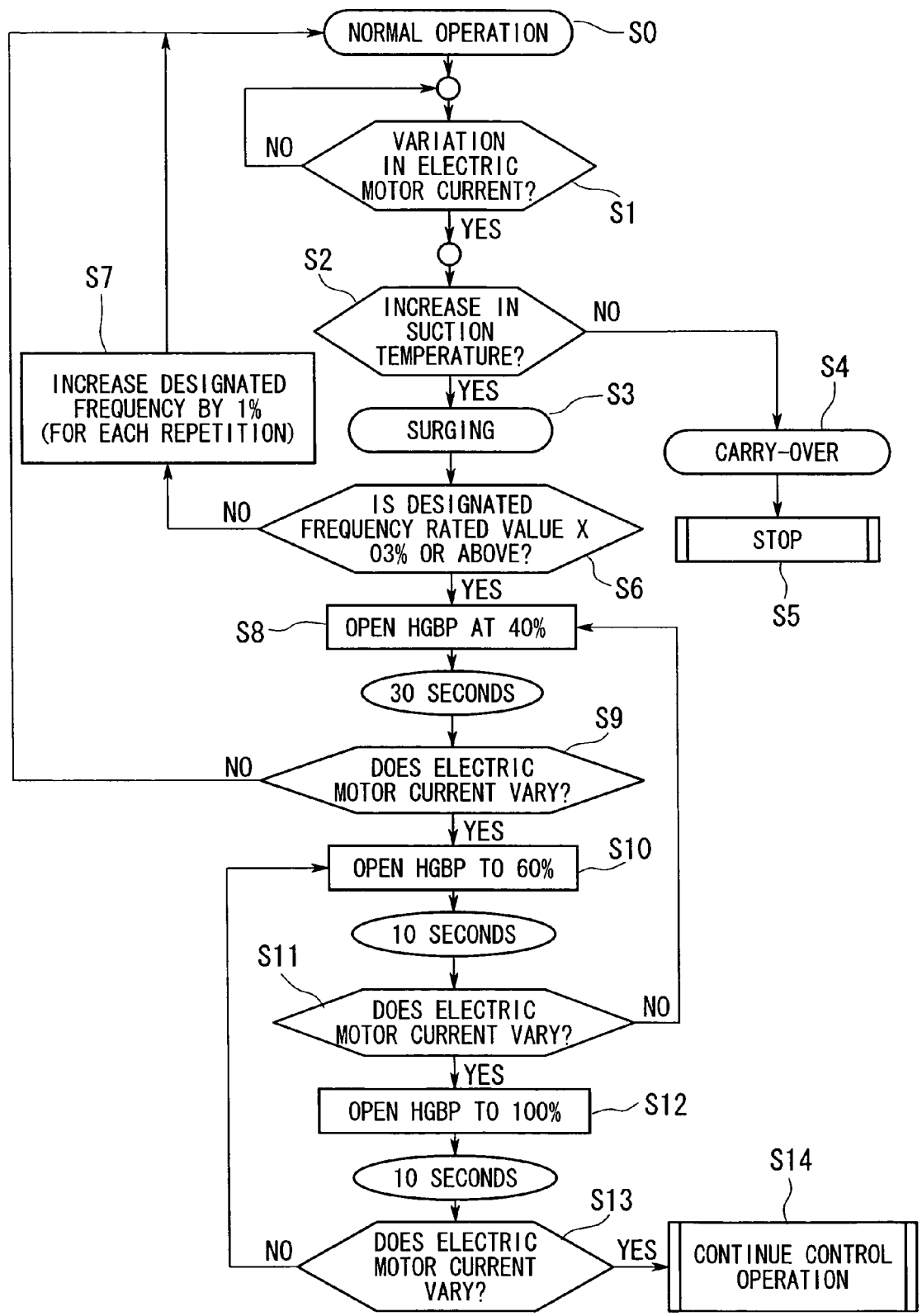
FIG. 3 is a flowchart showing the control flow for surging detection.

Next, a flowchart for surging detection will be described using FIG. 3.

In the case where a variation does not occur in the current value of the electric motor (driving current value), normal operation (S0) is carried out, and surging detection is not performed.

In the case where a variation does occur (S1) in the current value of the electric motor (driving current value), surging detection is performed.

It is determined whether or not a variation in the current value occurs by the changing-current determining device 15 as follows. That is, when two amplitudes 10 seconds apart are at least 5% higher than the average driving current and this condition is repeated for 30 seconds, and when the difference in average values every 10 seconds for this 30-second period is at least 2%, it is determined that the driving current changes.

If it is determined that the driving current varies, it is determined by the surging determining device 34 (see FIG. 1) whether the suction temperature Tsuc rises (S2).

That is to say, normally the suction temperature Tsuc is 1° C. to 2° C. higher than the evaporator temperature TE, which is calculated from the evaporator pressure PE in the evaporator 9. Accordingly, when the current suction temperature Tsuc is 3° C. to 5° C. higher with respect to the average suction temperature, averaged by sampling over the last 30-second period, it is determined by the surging determining device 34 that surging occurs (S3).

If the suction temperature Tsuc does not rise, it is determined that carry-over occurs (S4) and the electric motor 11 is stopped (S5) by means of an instruction from the surging control unit 36 (see FIG. 1).

When it is determined that surging occurs (S3), it is determined whether or not the designated inverter frequency of the electric motor 11 is 103% or greater (S6).

If it is determined that the designated inverter frequency does not exceed 103%, the designated inverter frequency is increased by 1% and the operation continues (S7).

If the designated inverter frequency is 103% or greater, the hot gas bypass valve 40a is opened by 40% by means of an instruction from the surging control unit 36 (S8).

In this way, the surging control operation is not performed as long as the designated inverter frequency does not exceed 103%.

After holding the valve opening at 40% for 30 seconds, it is again determined by the changing-current determining device 15 whether or not the current value varies (S9), similarly to step S2 described above.

If a variation in the current value still remains, the hot gas bypass valve 40a is opened further, to 60% (S10).

If there is no variation in the current value, it is determined that surging has been eliminated, and after waiting for 5 minutes, the operation returns to normal (S0).

After holding the valve opening at 60% for 10 seconds, it is again determined by the changing-current determining device 15 whether or not the current value varies (S11), similarly to step S2 described above.

If a variation in the current value still remains, the hot gas bypass valve 40a is eventually opened fully, to 100% (S12).

If there is no variation in the current value, after waiting for 5 minutes, the opening of the hot gas bypass valve 40a is reduced to 40% (S8). Then, it is determined again whether there is still a variation in the current value (S9).

After holding the valve opening at 100% for 10 seconds, it is again determined by the changing-current determining device 15 whether or not the current value varies (S13), similarly to step S2 described above.

If a variation in the current value still remains, the hot gas bypass valve 40$a$ is kept fully open, and the operation is forced to continue (S14).

If there is no variation in the current value, after waiting for 5 minutes, the opening of the hot gas bypass valve 40$a$ is closed to 60% (S10). Then, it is determined again whether the current value varies (S11).

According to the turbo chiller of the present embodiment, the following effects are achieved.

Since the resistance temperature sensor 25 for detecting the refrigerant temperature is provided at the upstream side of the impeller 22, that is, between the impeller 22 and the inlet vane 24, surging can be accurately detected. That is, since backwards flow of the refrigerant, due to surging, can be detected from the temperature, surging can be detected immediately, compared with the method based on the pressure difference between the two ends of the impeller 20, where attenuation due to the capacity of the condenser 5 and the evaporator 9 is unavoidable.

Also, because a drop in refrigerant temperature can be detected by the resistance temperature sensor 25, it is possible distinguish between carry-over and surging, contrary to the fact that it is difficult to distinguish between surging and carry-over only by detecting whether the driving current of the electrical motor varies.

It is detected, by means of the changing-current determining device 15, whether the driving current of the electric motor varies, and after determining whether surging or carry-over occurs in the centrifugal compressor, it is determined by the surging determining device 34 whether surging occurs. Therefore, the occurrence of surging can be determined accurately.

Since the hot gas bypass valve 40$a$ is opened in three separate steps, by performing hot gas bypass control, the thermal efficiency can quickly be prevented from decreasing.

By means of the excessive-rotation-speed determining device 12, because the control operation is not performed after surging detection as long as the rotation speed does not exceed the rated value of 103%, a certain increase in rotation speed is allowable and it is possible to delay changing to surging detection control, even when the rated rotation speed of the electrical motor 11 is exceeded due to a transient disturbance unrelated to surging, which is a sudden temperature change of the cooling water. Therefore, the erroneous detection of surging, due to a transient disturbance, can be prevented.

In addition to the above-described determination method for detecting surging, rotating stall may also be detected by means of the pressure sensor 32 (see FIG. 2) disposed on the outer circumferential edge of the diffuser 22. Since surging is caused by the growth of rotating stall occurring at the outer circumferential edge of the diffuser 22, this rotating stall can be detected by the pressure sensor 32, and the accuracy of surging detection can be improved further.

In the present embodiment a resistance temperature sensor 25 is used as the temperature sensor; however, it is not limited to this type of sensor so long as it has high measurement sensitivity. For example, a thermocouple having an unsheathed thin-diameter wire may be used.

Moreover, in the present embodiment, the resistance temperature sensor 25 is disposed between the impeller 20 and the inlet vane 24; however, instead of this, it may be disposed at the upstream side of the inlet vane 24 and at the downstream side of the compressor suction pipe 28 (T2 in FIG. 2.), or inside the compressor suction pipe 28 (T3 in FIG. 2).

What is claimed is:

1. A turbo chiller, comprising:
   a centrifugal compressor having a temperature sensor for detecting the temperature of a refrigerant at the upstream side of an impeller that compresses the refrigerant;
   a changing-current determining device which detects a driving current of an electric motor for driving the impeller to determine changes in the current;
   a surging determining device which detects a rise in refrigerant temperature from the output of the temperature sensor and determines the existence of surging based on the driving current detected by the changing-current determining device and the detected rise in refrigerant temperature;
   a rotation-speed control device that controls the rotation speed of the electric motor by means of an instruction; and
   an excessive-rotation-speed determining device for determining whether or not a designated value of the rotation speed control device exceeds a rating by a predetermined amount.

2. A turbo chiller according to claim 1, comprising:
   a hot gas bypass pipe which channels part of the refrigerant at the discharge side of the centrifugal compressor towards the suction side;
   a hot gas bypass valve disposed in the hot gas bypass pipe; and
   a hot gas bypass valve control device which, after determining the existence of surging with the surging determining device, opens the hot gas bypass valve by a predetermined amount and, in response to a change in current obtained by the changing-current determining device, further opens the hot gas bypass valve.

3. A turbo chiller according to claim 1, comprising:
   a hot gas bypass pipe which channels part of the refrigerant at the discharge side of the centrifugal compressor towards the suction side;
   a hot gas bypass valve disposed in the hot gas bypass pipe; and
   a hot gas bypass valve control device which, after determining the existence of surging with the surging determining device, opens the hot gas bypass valve by a predetermined amount.

* * * * *